May 3, 1932.  E. C. CLAUS  1,856,864
COOKING DEVICE
Filed Nov. 10, 1927  2 Sheets-Sheet 1
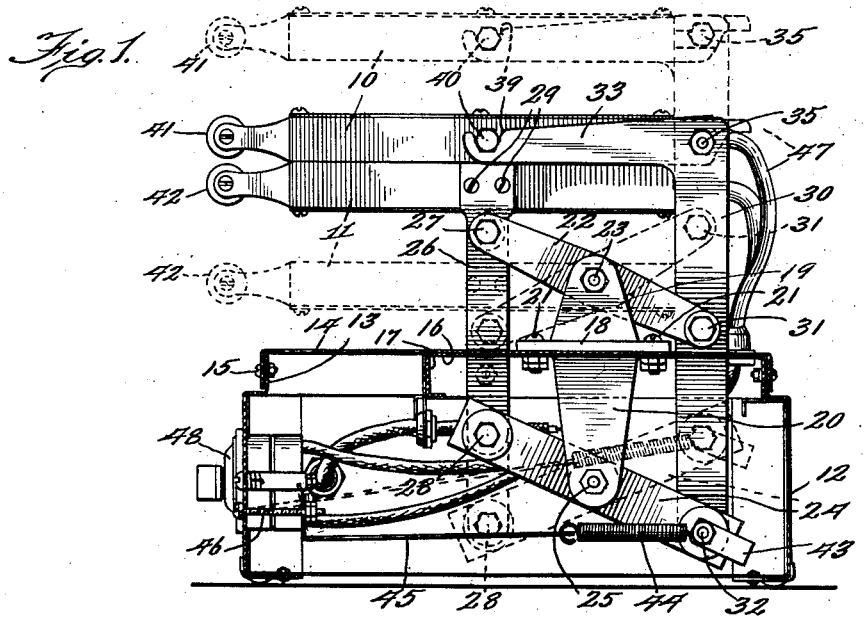
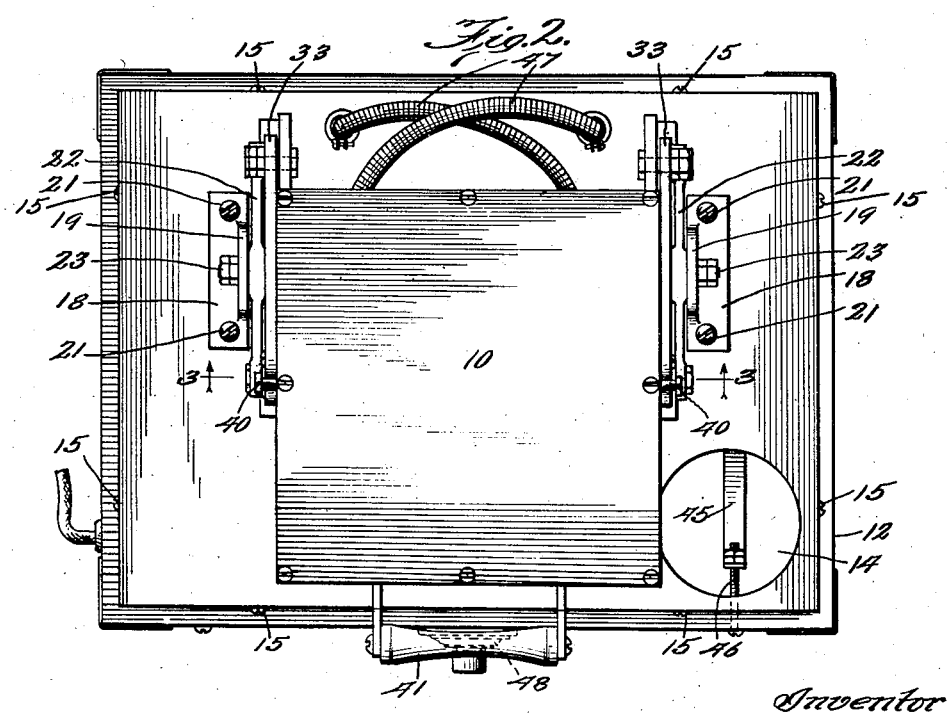
Inventor:
Ernst C. Claus
By Nissen & Crane
Att'ys May 3, 1932.  E. C. CLAUS  1,856,864
COOKING DEVICE
Filed Nov. 10, 1927   2 Sheets-Sheet 2

Inventor:
Ernst C. Claus
By Nissen & Crane
Attys.

Patented May 3, 1932

1,856,864

UNITED STATES PATENT OFFICE

ERNST C. CLAUS, OF CHICAGO, ILLINOIS, ASSIGNOR, BY MESNE ASSIGNMENTS, TO ERNEST REICH, OF CHICAGO, ILLINOIS

COOKING DEVICE

Application filed November 10, 1927. Serial No. 232,265.

This invention relates to a device especially adapted for toasting sandwiches and other articles of food, although it may be utilized for other cooking operations, such as baking waffles and cooking other articles of food to which heat is applied from one or both sides.

One object of the invention is to provide a device of the class named which shall be convenient to operate, economical to manufacture, strong and durable, attractive in appearance and efficient in the preparation of food products.

Other objects and advantages will appear from the following description.

The invention is exemplified in the combination and arrangement of parts shown in the accompanying drawings and described in the following specification, and it is more particularly pointed out in the appended claims.

In the drawings:—

Fig. 1 is an elevation with parts in section showing one embodiment of the present invention;

Fig. 2 is a top plan view of the device shown in Fig. 1;

Figure 3:
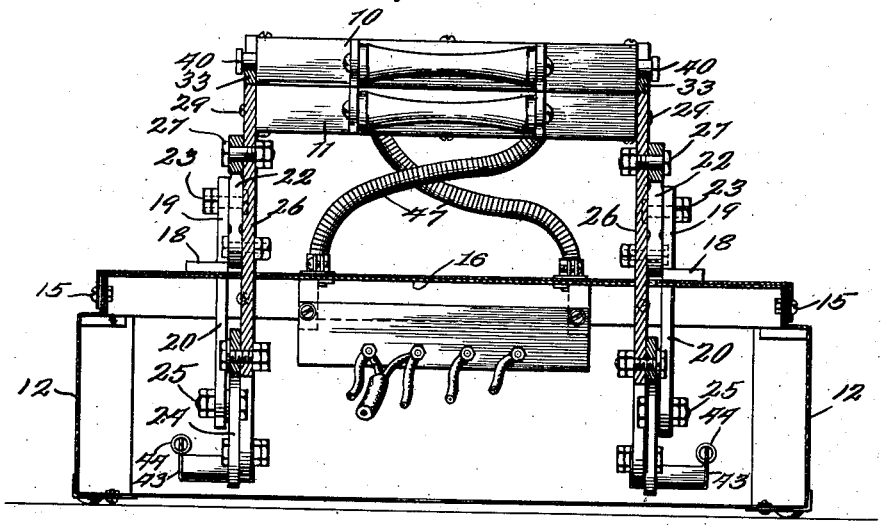
Fig. 3 is a vertical sectional view substantially on line 3—3 of Fig. 2.

The invention comprises upper and lower heating plates 10 and 11 mounted on a base 12 in a manner to move toward and away from each other while maintaining their parallel relation. The base 12 is made of sheet metal and is open on the inside to accommodate electric wiring and operating mechanism. The base 12 is provided with an upstanding flange 13 to which a cover plate 14 is attached having downwardly bent edges secured to the flange 13 by bolts 15. A portion of the cover plate 14 is reinforced by a plate 16 having a peripheral flange 17. A pair of brackets 18 having upwardly extending arms 19 and downwardly extending arms 20 are mounted on the top plate 14 and reinforcing plate 16 and secured thereto by bolts 21. Cross-bars 22 are pivotally mounted at 23 on the arms 19 and cross-bars 24 are pivotally mounted at 25 on the arms 20. Upright bars 26 are pivoted at 27 and 28 to the bars 22 and 24, respectively. The bars 26 support the heating plate 11, rigidly fixed to their upper ends by screws 29. Directly in the rear of the uprights 26 is a pair of uprights 30 pivoted at 31 and 32 respectively to the rear ends of the pivoted bars 22 and 24. The uprights 30 are provided with forwardly extending arms 33, the forward ends of which are disposed directly above the upper ends of the uprights 26. The heating plates 10 are provided with rearwardly extending lugs 34, as shown more clearly in Fig. 4, the lugs being pivotally mounted on bolts 35 carried at the upper ends of the uprights 30. The lugs 34 are provided with elongated openings 36 which engage the bolts 35 to permit a limited movement of the lugs on their pivot bolts. The heating plate 10 may be swung upwardly, as shown in broken lines in Fig. 4, until stopped by ears 37 on the lugs 34 which engage stop pins 38 on the uprights 30.

The forward ends of the arms 33 are provided with depressions 39 for receiving pins 40 extending laterally from the edges of the heating plate 10. It will be seen that the pivot bars 22 and 24 and the uprights 26 and 30 form a parallel motion support for the heating plates 10 and 11 so that these plates may be moved toward and away from each other while retaining their parallel relation.

Figure 4:
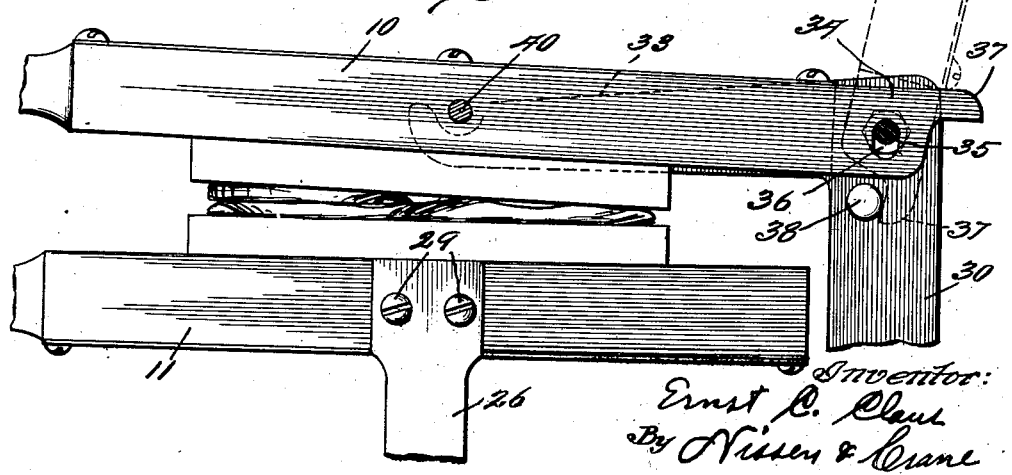
Fig. 4 is a fragmentary elevation of the heating plates supplied to a sandwich to be toasted.

In Fig. 4 the plates are shown in the position they assume when the forward ends of the arms 22 and 24 are raised. The lower plate is supported on the forward ends of the arms 22 and 24 and the upper plate is supported on the rear ends of these arms so that when the forward ends of the arms are up, the rear ends of the arms will be down and the plates 10 and 11 will be moved together. The plates 10 and 11 are provided with handles 41 and 42, respectively, and, by grasping the lower handle 42, both plates may be moved simultaneously. By grasping the upper handle 41, the upper plate may be lifted away from the lower plate, as shown in Fig. 4, while the lower plate remains stationary.

Fixed to the rear ends of the bars 24 are brackets 43 having springs 44 connected therewith, the springs being connected by rods 45 to adjustment bolts 46, the forward ends of which are secured to the front face of the base 12. When the heating plates are moved up and down, the bracket 43 will also move up and down, so that the spring 44 will move past the pivotal center 25 of the bar 24.

When the parts are in the position shown in Fig. 1, the springs 44 will hold the plates 10 and 11 together and will act to draw the plates toward each other until they are separated a sufficient distance to move the springs 44 past the pivotal axis 25. This position is shown in broken lines in Fig. 1 and the parts are held in this position by the springs 44 because the springs are then shifted past their dead-center position. When the heating plates are moved slightly toward each other from the position shown in broken lines in Fig. 1, the springs 44 will again move below the pivotal axis 25 and will thereafter tend to draw the plates toward each other, so that if a sandwich or other article to be toasted is placed between the plates, the springs 44 will press the plates upon the article. The plates 10 and 11 may be provided with any suitable form of heating element arranged within the plates, and current may be supplied to the heating element through conductors 47. The current to the conductors is controlled by a switch 48 which may be arranged to supply varying amounts of current for controlling the temperature of the heating plates.

It will be seen that the plane of the upper plate will be shifted relative to the plane of the lower plate to accommodate sandwiches or other articles of uneven thickness. The lugs 40 may be lifted at one or both sides from their supporting notches 39, and the elongated openings 36 will permit the rear of the plate to tilt so that the plates will accommodate themselves to uneven thicknesses of articles being toasted. Instead of toasting plates, waffle irons or other heating elements may be substituted, as will be readily apparent.

Since the plates are balanced against each other by the parallel motion mechanism on which they are mounted, they will move easily and will be held either in open or closed position by the springs 44.

I claim:—

1. A heating device, including opposed parallel cooperating heating plates mounted for relative movement toward and away from each other and adapted to assume an operative position with an article to be heated arranged therebetween and contacting therewith, and a spring operative to urge said plates relatively toward each other when they are in operative position and away from each other when in open position.

2. A heating device, including opposed parallel cooperating heating plates adapted to assume an operative position with an article to be heated arranged therebetween and contacting therewith, means for effecting relative movement of said plates toward and away from each other, and at the same time maintaining the parallelism of the plates, and a spring operative to urge said plates relatively toward each other when they are in operative position and away from each other when in open position.

3. A heating device, including opposed parallel cooperating heating plates adapted to assume an operative position with an article to be heated arranged therebetween and contacting therewith, means for effecting relative movement of said plates toward and away from each other, and at the same time maintaining the parallelism of the plates, a spring operative to urge said plates relatively toward each other when they are in operative position and away from each other when in open position, and means for adjusting the tension of said spring.

4. A toaster comprising a hollow base member, a pair of heating plates disposed above said base member, uprights connected to the central portion of opposite edges of the lower one of said heating plates, balance levers pivotally mounted on said base and having their forward ends pivotally connected with said uprights respectively, uprights disposed adjacent the rear portion of said base and pivotally connected to the rear ends of said balance levers, the upper one of said plates being pivotally connected to said last-named uprights, arms projecting forwardly from said last-named uprights and supporting the central portion of the upper one of said heating plates, balance levers pivotally mounted within said base and connecting the uprights of said respective plates, a spring disposed within said base and connected with said last-named balance levers and movable past the pivotal axis of said last-named balance levers when said plates are moved toward and away from each other, and electrical circuits for supplying current to said heating plates.

5. A toaster comprising a hollow base, spaced uprights extending through the top of said base substantially midway between the front and rear thereof, a heating plate fixed to the upper ends of said uprights substantially midway between the front and rear of said heating plate, a second pair of uprights extending through the top of said base adjacent the rear thereof, a second heating plate pivotally connected at its rear edge to said second pair of uprights, spaced balance levers connecting the uprights of said pairs, respectively, to form therewith parallel motion mechanism for supporting said heating plates, said rear uprights having arms extending forwardly and loosely supporting the central portion of the uppermost heating plate, handles connected to the forward edges of said heating plates, and spring means connected with said balance levers and movable past a dead-center position when said plates are shifted toward and away from each other and arranged to hold said plates at either extremity of their movement toward and away from each other.

In testimony whereof I have signed my name to this specification on this 8th day of November, A. D. 1927.

ERNST C. CLAUS.